United States Patent
Vadhavkar et al.

(10) Patent No.: US 9,973,102 B1
(45) Date of Patent: May 15, 2018

(54) SYSTEM FOR POWER CONVERSION WITH FEEDBACK TO REDUCE DC BUS LOADING

(71) Applicant: Rockwell Automation Technologies, Inc., Mayfield, OH (US)

(72) Inventors: Prathamesh R. Vadhavkar, Grafton, WI (US); Brian J. Seibel, Grafton, WI (US); Ahmed Sayed Ahmed, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days. days.

(21) Appl. No.: 15/408,757

(22) Filed: Jan. 18, 2017

Related U.S. Application Data

(60) Provisional application No. 62/438,636, filed on Dec. 23, 2016, provisional application No. 62/438,666, filed on Dec. 23, 2016.

(51) Int. Cl.
| | | |
|---|---|---|
| *H02M 5/45* | (2006.01) | |
| *H02M 5/458* | (2006.01) | |
| *H02M 1/084* | (2006.01) | |
| *H02M 1/12* | (2006.01) | |
| *H02M 1/32* | (2007.01) | |
| *H02P 27/08* | (2006.01) | |

(Continued)

(52) U.S. Cl.
CPC ........... *H02M 5/458* (2013.01); *H02M 1/084* (2013.01); *H02M 1/12* (2013.01); *H02M 1/32* (2013.01); *H02P 27/08* (2013.01); *H02P 29/032* (2016.02); *H02M 2001/0009* (2013.01)

(58) Field of Classification Search
CPC ........ H02M 5/458; H02M 1/12; H02M 1/084; H02M 1/32; H02M 2001/0009; H02P 29/032; H02P 27/08
See application file for complete search history.

(56) References Cited

U.S. PATENT DOCUMENTS

| | | |
|---|---|---|
| 5,731,965 A | 3/1998 | Cheng et al. |
| 2012/0081058 A1 | 4/2012 | Bortolus et al. |

(Continued)

OTHER PUBLICATIONS

M. Parvez et al., "An improved active-front-end rectifier using model predictive control," 2015 IEEE Applied Power Electronics Conference and Exposition (APEC), Charlotte, NC, 2015, pp. 122-127, doi: 10.1109/APEC.2015.7104341.

(Continued)

*Primary Examiner* — Adolf Berhane
*Assistant Examiner* — Afework Demisse
(74) *Attorney, Agent, or Firm* — Boyle Fredrickson, SC

(57) ABSTRACT

A power conversion system can be implemented to reduce load disturbances on a DC bus which may be caused by load activity, such as a motor starting, stopping and/or ramping up or down. In one aspect, the power conversion system can receive externally supplied multi-phase AC electric power, such as three-phase power from a power grid, and use a converter circuit to generate the DC bus. The power conversion system can then use an inverter circuit to generate multi-phase AC electric power from the DC bus for driving the load with adjustable frequencies and/or amplitudes as desired. The power conversion system can receive feedback signals to sense the load activity and adjust the converter and/or inverter circuits accordingly to reduce the load disturbances on the DC bus.

16 Claims, 6 Drawing Sheets

(51) Int. Cl.
*H02P 29/032* (2016.01)
*H02M 1/00* (2006.01)

(56) References Cited

U.S. PATENT DOCUMENTS

2012/0212982 A1* 8/2012 Wei ................... H02M 5/4585
363/37
2014/0152012 A1 6/2014 Kim et al.

OTHER PUBLICATIONS

M. Parvez et al.; "A robust modified model predictive control (MMPC) based on Lyapunov function for three-phase active-front-end (AFE) rectifier," 2016 IEEE Applied Power Electronics Conference and Exposition (APEC), Long Beach, CA, 2010, pp. 1163-1168.
Daniel E. Quevedo et al,: "Model Predictive Control of an AFE Rectifier With Dynamic References," in IEEE Transactions on Power Electronics, vol. 27, No. 7, pp. 3128-3136, Jul. 2012.
T.F. Wu et al.; "Capacitor-current compensation with fast voltage loop for D-Σ digital control based three-phase four-wire inverter," 2015 IEEE 2nd International Future Energy Electronics Conference (IFEEC), Taipei, 2015, pp. 1-6.
T.F. Wu et al.: "Iterative learning control with filter-capacitor current compensation for a three-phase four-wire inverter." 2013 Twenty-Eighth Annual IEEE Applied Power Electronics Conference and Exposition (APEC), Long Beach, CA, 2013, pp. 2288-2294.

* cited by examiner

SYSTEM FOR POWER CONVERSION WITH FEEDBACK TO REDUCE DC BUS LOADING

CROSS-REFERENCE TO RELATED APPLICATION(S)

This application claims priority to U.S. Provisional Patent Application No. 62/438,636, entitled "System for Power Conversion with Feedback to Reduce DC Bus Loading," and U.S. Provisional Patent Application No. 62/438,666, entitled "System for Power Conversion with Reactive Power Compensation," each filed on Dec. 23, 2016, which are herein incorporated by reference.

FIELD OF THE INVENTION

The present invention relates to the field of industrial control systems, and more particularly, to power conversion systems for driving loads, such as motors, in an industrial control environment.

BACKGROUND OF THE INVENTION

Power conversion systems for driving loads, such as motors, typically receive AC input power which is converted to an internal DC bus for subsequent conversion to AC output power for driving a load. The system typically includes a converter circuit which receives the AC input power for producing the internal DC bus, and an inverter circuit which receives the internal DC bus for producing the AC output power. The converter circuit and the inverter circuit each typically include multiple controlled switching devices, such as Insulated Gate Bipolar Transistors (IGBT's), for producing the aforementioned DC bus and AC output power, respectively. However, load activity, such as sudden motor acceleration, deceleration, load application and/or load removal, can propagate back to the DC bus, thereby causing the DC bus to temporarily shift and/or destabilize. Such load disturbances on the DC bus can reduce overall system margins and render the power conversion system susceptible to undesirable resonance or over/under voltage faults. A need therefore exists to provide a power conversion system for driving a load which mitigates one or more of the foregoing disadvantages.

SUMMARY OF THE INVENTION

A power conversion system can be implemented to reduce load disturbances on a DC bus which may be caused by load activity, such as a motor starting, stopping and/or ramping up or down. In one aspect, the power conversion system can receive externally supplied multi-phase AC electric power, such as three-phase power from a power grid, and use a converter circuit to generate the DC bus. The power conversion system can then use an inverter circuit to generate multi-phase AC electric power from the DC bus for driving the load with adjustable frequencies and/or amplitudes as desired. The power conversion system can receive feedback signals to sense the load activity and adjust the converter and/or inverter circuits accordingly to reduce the load disturbances on the DC bus.

Load disturbances on the DC bus can be caused by sudden motor acceleration, deceleration, load application and/or load removal. Such disturbances can propagate back to the DC bus, thereby causing the DC bus to temporarily shift and/or destabilize. This can reduce overall system margins and render the power conversion system susceptible to undesirable resonance or over/under voltage faults. Accordingly, a load disturbance feed forward can be used to reject the impact of load disturbances to better stabilize the DC bus. The load disturbance feed forward can be achieved, for example, by utilizing a power command from the inverter circuit as a feed forward term that can be applied to a control loop which considers a DC reference value in controlling the converter circuit to generate the DC bus.

In one aspect, an inverter control system can calculate motoring/regenerating power in real time while operational. A converter control system can receives this calculated power from inverter control system. The converter control system can then process this power feed forward and adjust an active current reference. A current regulator can then be implemented to regulate the active current to deliver or consume power consistent with inverter control system. Accordingly, a stable DC bus can be maintained during heavy transient conditions.

Specifically then, one aspect of the present invention can provide a power conversion system including: a converter circuit configured to convert a multi-phase AC input power to produce a DC bus, the converter circuit including multiple rectifier switching devices controlled by multiple rectifier switching control signals to produce the DC bus; an inverter circuit coupled to the DC bus, the inverter circuit including multiple inverter switching devices controlled by multiple inverter switching control signals to produce a multi-phase AC output power for driving a load; and a controller executing a program stored in a non-transient medium operable to: (a) receive a feedback signal corresponding to the multi-phase AC output power; and (b) adjust the multiple rectifier switching control signals according to the feedback signal to stabilize the DC bus.

Another aspect of the present invention can provide a method for power conversion including: converting a multi-phase AC input power to produce a DC bus using multiple rectifier switching devices controlled by multiple rectifier switching control signals; producing a multi-phase AC output power for driving a load using multiple inverter switching devices coupled to the DC bus and controlled by multiple inverter switching control signals; receiving a feedback signal corresponding to the multi-phase AC output power; and adjusting the plurality of rectifier switching control signals according to the feedback signal to stabilize the DC bus.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE OF THE INVENTION

Figure 1:
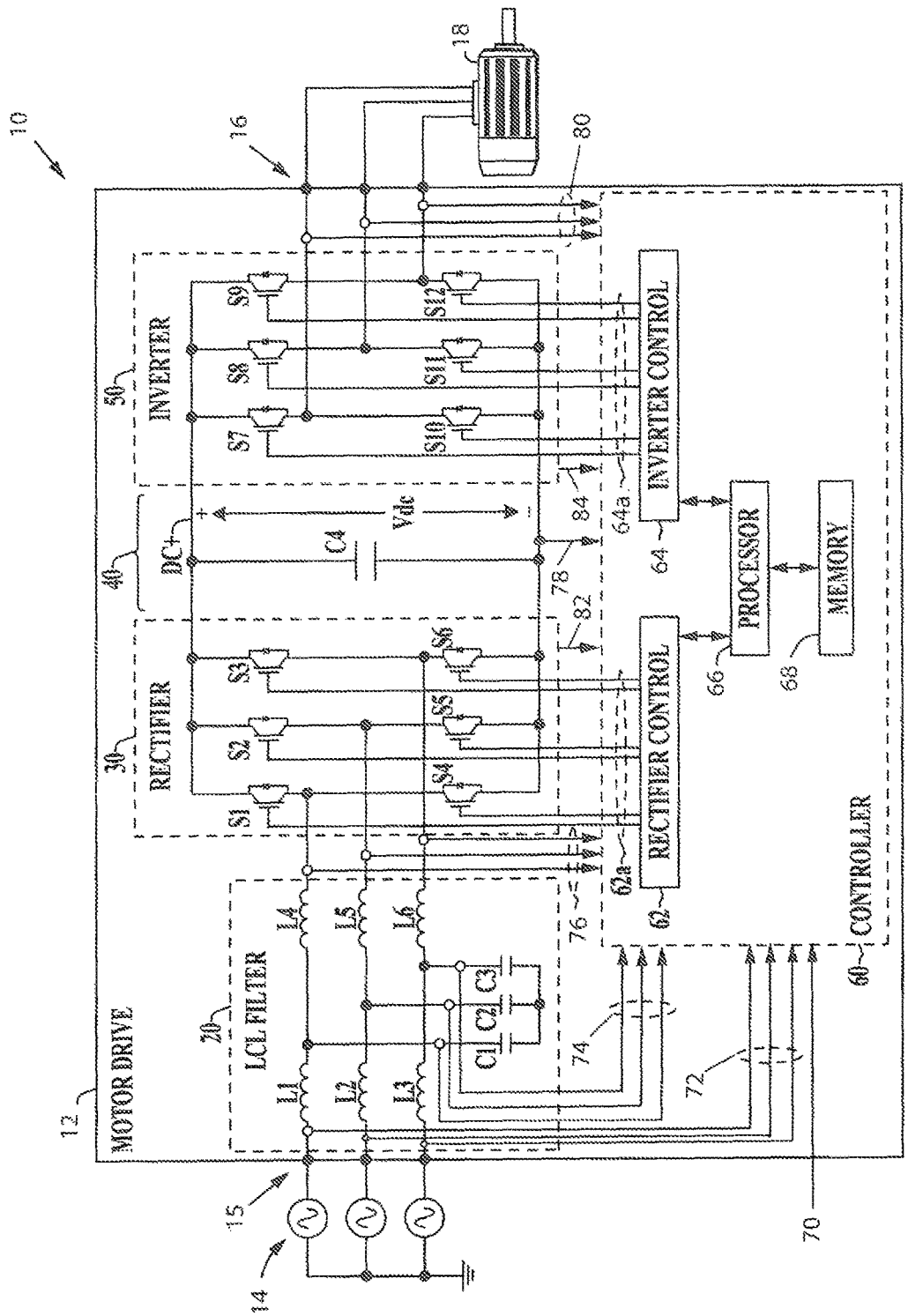
FIG. 1 is an industrial control system including a power conversion system configured to receive feedback in accordance with an aspect of the invention.

Referring now to FIG. 1, in accordance with an aspect of the invention, an industrial control system 10 can include a power conversion system 12 configured to receive multi-phase AC input power 14 at a plurality of AC input terminals 15 and provide multi-phase AC output power at a plurality of AC output terminals 16 for driving a load 18. The load 18 could be a motor, and the power conversion system 12 could be a motor drive type power conversion system receiving three-phase AC input power from a three-phase source, such as an electrical power grid. Although illustrated in the context of three-phase power driving a three phase motor load, it should be appreciated that the disclosed concepts can be employed in multi-phase power conversion systems having any number of input and output phases.

The power conversion system 12 includes a multi-phase input filter circuit 20 coupled between the AC input terminals 15 and an AC input for an active/switching rectifier circuit 30 (also referred to as a "converter" or an "active front end"). The filter circuit 20 can be configured to attenuate switching frequency harmonics which may be produced by the rectifier circuit 30. In one aspect, the filter circuit 20 can be an "LCL" input filter circuit which provides an inductor-capacitor-inductor arrangement for each power phase. Alternatively, the filter circuit 20 could be an "LC" input filter circuit or other arrangement. In the configuration of FIG. 1, the filter circuit 20 is an LCL filter circuit which includes inductors L1-L6 and Y-connected filter capacitors C1-C3. As shown, for a first power phase, the filter circuit 20 includes two series inductors, L1 and L4, and a Y-connected filter capacitor, C1, between the two series inductors. Similarly, for a second power phase, the filter circuit 20 includes two series inductors, L2 and L5, and a Y-connected filter capacitor, C2, between the two series inductors, and for a third power phase, the filter circuit 20 includes two series inductors, L3 and L6, and a Y-connected filter capacitor, C3, between the two series inductors. Accordingly, the three capacitors C1, C2 and C3 can be individually connected between a corresponding one of the filter phases and a common connection point, such as a neutral, as shown. In other examples, the filter capacitors C1, C2 and C3 can be connected in a Delta configuration (not shown).

An optional pre-charge circuit (not shown) can be coupled between the AC input terminals 15 and the filter circuit 20. If present, the pre-charge circuit can be configured to protect the power conversion system 12 from an in rush of current from the AC input power 14.

The power conversion system 12 further includes an intermediate DC bus circuit 40 ("DC bus") coupled to the rectifier circuit 30, an active/switching inverter circuit 50 coupled to the DC bus circuit 40, and a controller 60 in communication with the rectifier circuit 30, the DC bus circuit 40 and the inverter circuit 50. The controller 60 includes a rectifier control component 62 and an inverter control component 64 to provide rectifier switching control signals 62a and inverter switching control signals 64a to operate the rectifier circuit 30 and the inverter circuit 50, respectively. The controller 60 can also include processing and memory logic, such as a processor 66 in communication with a memory 68, for executing a program stored in a non-transient medium operable to implement advanced control capabilities implemented by the controller 60 according to various modes as detailed further hereinafter. Such processing logic, memory logic and/or control components can be implemented, for example, by way of one or more of microprocessors, microcontrollers, Digital Signal Processors (DSP's), Field Programmable Gate Arrays (FPGA's), Random Access Memories (RAM) and/or Flash memories which may be in communication with one another in various ways. Additionally, in other aspects, the rectifier circuit 30 can be connected to provide a shared DC bus (at the DC bus circuit 40) for driving multiple inverter circuits and, in turn, multiple motor loads.

In normal operation, the controller 60 can implement motor control functions by receiving the AC input power 14 at the AC input terminals 15 from an AC source, converting the AC input power into DC power (at the DC bus circuit 40) using the rectifier circuit 30, and converting the DC power (at the DC bus circuit 40) to adjustable frequency, adjustable amplitude multi-phase AC output power to drive the load 18, via the inverter circuit 50. The rectifier circuit 30 can include switching devices S1-S6 individually coupled between a corresponding one of the AC input phases and a corresponding DC bus terminal (DC+ or DC−) of the DC bus circuit 40. The rectifier control component 62 of the controller 60 can operate the rectifier circuit 30 in a switching mode via the rectifier switching control signals 62a. The rectifier switching control signals 62a can be provided to the rectifier switches S1-S6 to cause the rectifier circuit 30 to convert received three-phase AC input power to provide a DC voltage "Vdc" across a DC bus capacitance C4 of the DC bus circuit 40 using any suitable modulation technique, such as Pulse Width Modulated (PWM). The inverter circuit 50 can receive DC input power from the DC bus circuit 40, and can include inverter switches S7-S12 individually coupled between one of the positive or negative DC bus terminals and a corresponding output phase for coupling to the load 18. In certain aspects, the output of the inverter circuit 50 can be connected directly to the leads of the load 18 via the AC output terminals 16. In other aspects, one or more intervening components may be connected between the output of the inverter circuit 50 and the load 18, such as a filter and/or a transformer (not shown). The inverter switches S7-S2 can be operated according to inverter switching control signals 64a provided by the inverter control component 64 of the controller 60. The inverter control component 64 can generate the inverter switching control signals 64a according to any suitable modulation technique, such as Pulse Width Modulated (PWM). Accordingly, the inverter circuit 50 can convert the DC power from the DC bus circuit 40 to provide adjustable frequency, adjustable amplitude AC output power to drive the load 18. The rectifier circuit 30 and the inverter circuit 50 can employ any suitable form of switching devices S1-S12, including, for example, any combination of Insulated Gate Bipolar Transistors (IGBT's), Silicon Controlled Rectifiers (SCR's), Gate Turn-Off Thyristors (GTO's) and/or Integrated Gate Commutated Thyristors (IGCT's).

As shown in FIG. 1, the controller 60 can be configured to receive multiple feedback signals representing operating parameters of the power conversion system 12. The feedback signals can be measured and/or used to calculate additional parameters by the controller 60. Specifically, the controller 60 can receive: a DC bus reference signal 70, which can be an externally supplied signal for determining a DC bus reference value, or which can represent a DC bus reference value set by the controller 60; feed forward current signals 72, which can be signals for determining current values for each phase at the input of the filter circuit 20; filter capacitor currents signals 74, which can be signals for determining current values for each phase, flowing in the capacitors C1-C3, at the filter circuit 20; current feedback signals 76, which can be signals for determining current values for each phase at the input of the rectifier circuit 30; a DC bus signal 78, which can be a signal for determining a voltage value corresponding to the DC voltage "Vdc" across the DC bus capacitance C4 of the DC bus circuit 40; active power feedback signals 80, which can be signals for determining current values for each phase at the output of the rectifier circuit 30; a rectifier temperature signal 82, which can be a signal for determining a value corresponding to a temperature of the rectifier circuit 30; and/or an inverter temperature signal 84, which can be a signal for determining a value corresponding to a temperature of the inverter circuit 50. Accordingly, the controller 60, via the processor 66, can execute a stored program which may be implemented as software and/or firmware for adjusting the rectifier circuit 30 and/or the inverter circuit 50, via the rectifier switching control signals 62a and/or the inverter switching control signals 64a, respectively, based on measured or determined values using one or more of the aforementioned feedback signals.

Figure 2:
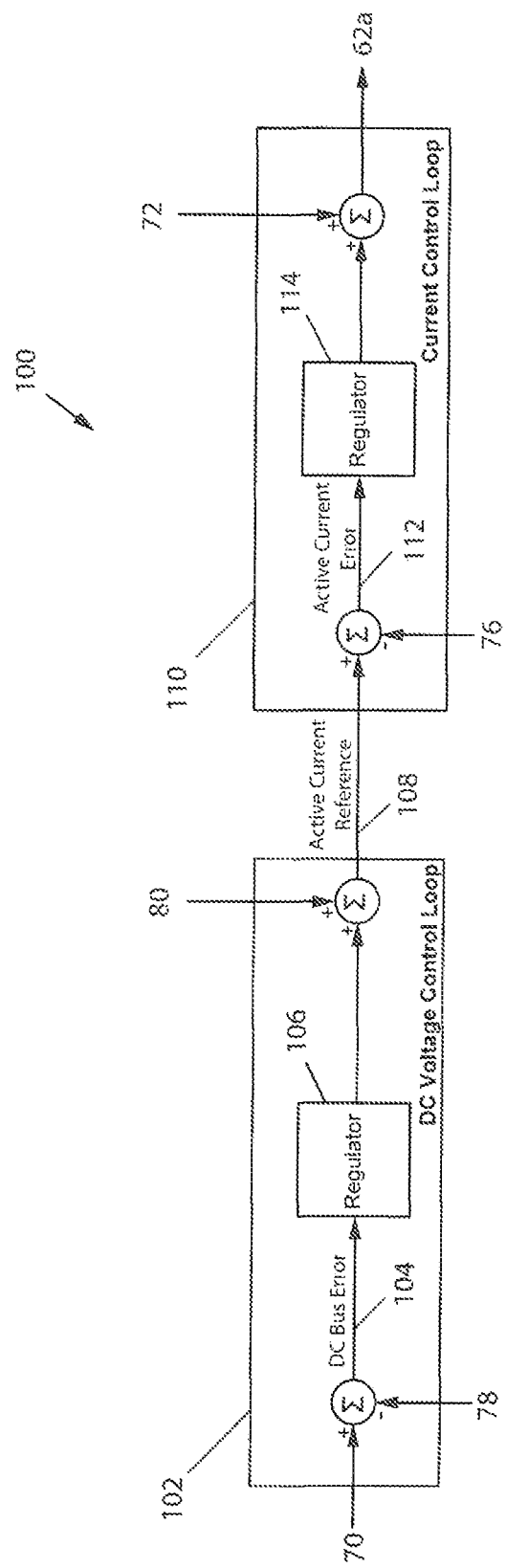
FIG. 2 provides control loops which may be executed by a controller in the power conversion system of FIG. 1.

With additional reference to FIG. 2, in one aspect, to reject the impact of load disturbances which may be caused by load activity, such as the load 18, which may be a motor, starting, stopping and/or ramping up or down, and to thereby stabilize the DC bus, the controller 60 can receive one or more of the aforementioned feedback signals and execute control loops 100. In a first control loop 102, which may be a DC voltage control loop, the controller 60 can compare a value determined from the DC bus reference signal 70 to a value determined from the DC bus signal 78 to produce a DC bus error 104 representing a difference between the two values. The DC bus error 104 can then be applied to a first regulator function 106 to produce an output to be summed in a first summation with one or more values determined from the active power feedback signals 80 for each power phase, respectively. The aforementioned first summation produces an active current reference value 108 which can then be applied to a second control loop 110.

In the second control loop 110, which may be a current control loop, the controller 60 can then compare the active current reference value 108 from the first control loop 102 to one or more values determined from the current feedback signals 76 for each power phase, respectively, to produce one or more active current errors 112 representing differences between the values. The active current errors 112 can then be applied to a second regulator function 114 to produce an output to be summed in a second summation with one or more values determined from the feed forward current signals 72 for each power phase, respectively. The aforementioned second summation then produces values for adjusting/updating the rectifier switching control signals 62a to be applied to the rectifier circuit 30 to stabilize the DC bus at the DC bus terminal (DC+ or DC−) of the DC bus circuit 40. It should be appreciated that the first and/or second regulator functions 106 and/or 114, respectively, can be implemented according to a variety of control loop techniques, such as, for example, Proportional-Integral (PI) regulation, as desired. Accordingly, in executing the control loops 100, the controller 60 can reduce load disturbances on the DC bus while driving the load 18 with adjustable frequencies and/or amplitudes as desired. In addition, in aspects in which the rectifier circuit 30 is connected to provide a shared DC bus (at the DC bus circuit 40) for driving multiple inverter circuits and, in turn, multiple loads, the controller 60 can execute the control loops 100 to reduce load disturbances on the DC bus while driving the multiple inverter circuits and loads.

Figure 3A:
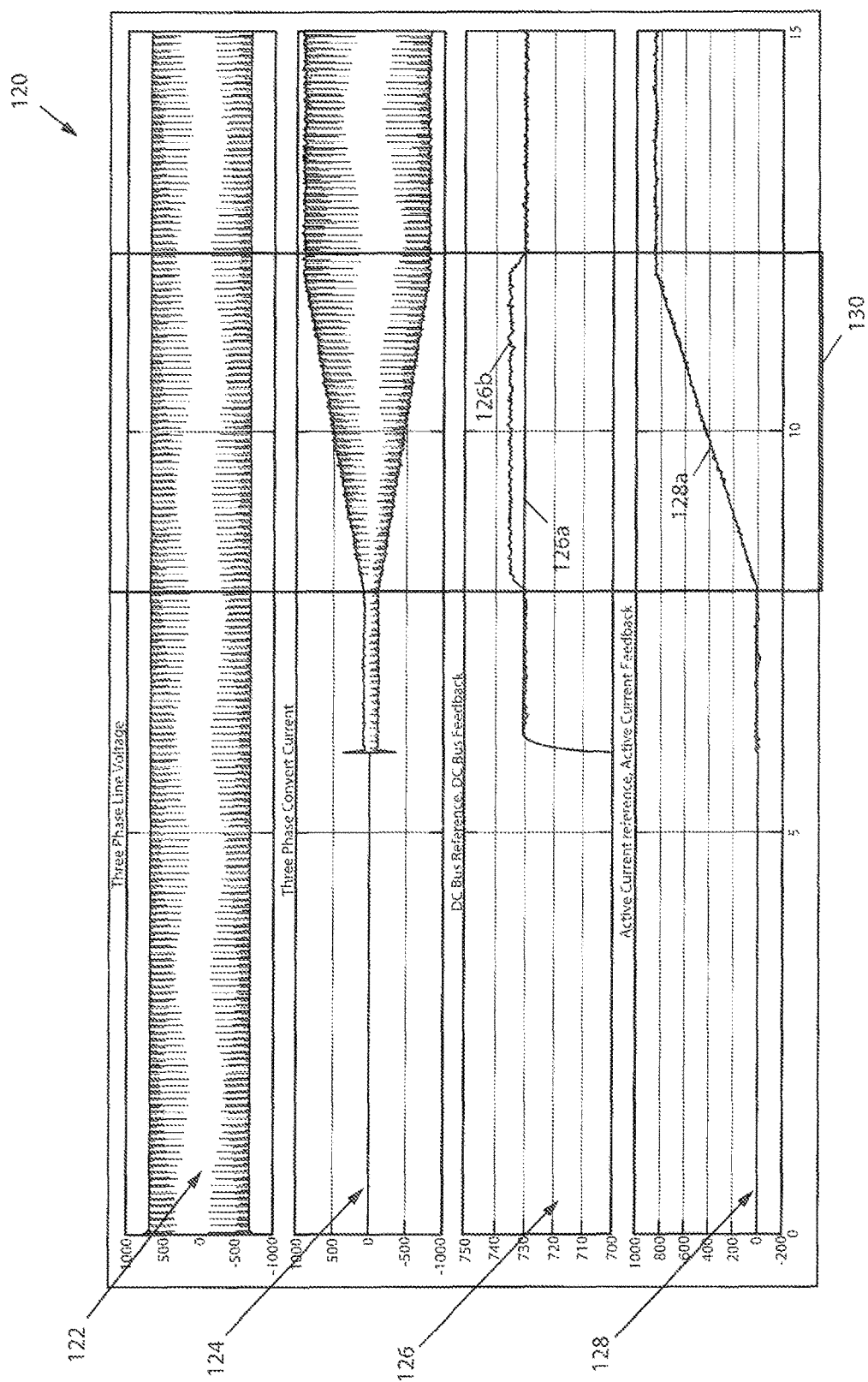
FIG. 3A is an exemplar waveform analysis without adjustment by the controller of FIG. 2, showing a DC bus value shifting.
Figure 3B:
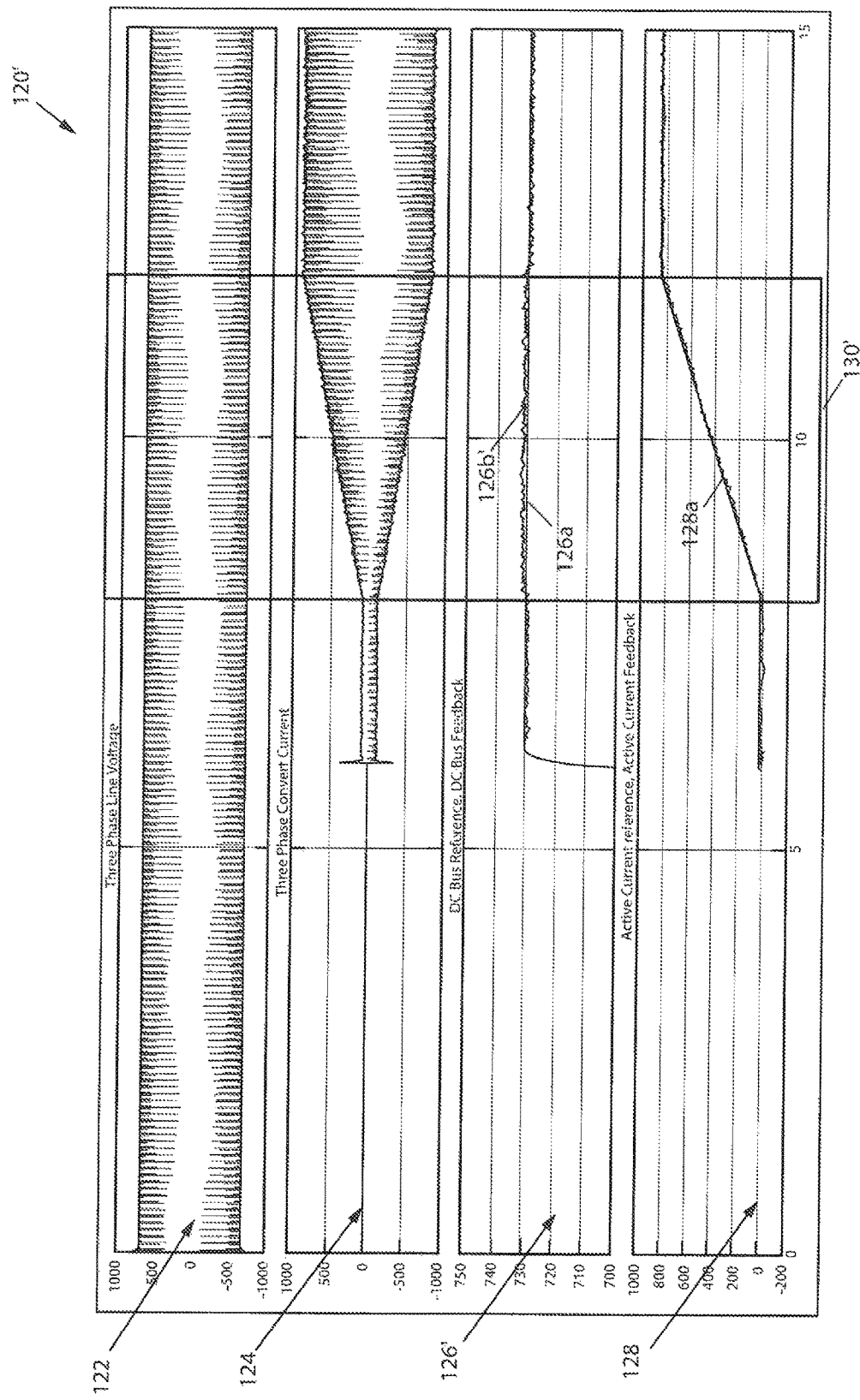
FIG. 3B is an exemplar waveform analysis with adjustment by the controller of FIG. 2, showing the DC bus value stabilized, in accordance with an aspect of the invention.

Referring now to FIG. 3A, by way of example, without adjustment of the rectifier switching control signals 62a according to one or more of the feedback signals, a first waveform analysis 120 includes: a multi-phase AC power waveform 122, which may be provide to the power conversion system 12 from an AC power source; a multi-phase AC input power waveform 124 as received at the rectifier circuit 30; a DC bus waveform 126, which compares a DC bus reference 126a to a determined DC bus value 126b; and an active current reference waveform 128 (or active power feedback), which illustrates load activity which may be caused by the load 18. Each of the aforementioned waveforms is compared to one another with respect to time. In a time period 130, the load 18 may power up as illustrated by a feedback slope 128a of the active current reference. This may be a load disturbance which undesirably causes the DC bus to shift from the DC bus reference, as shown by the DC bus value 126b shifting from the DC bus reference 126a in the time period 130. However, referring now to FIG. 3B, with adjustment of the rectifier switching control signals 62a according to one or more of the feedback signals, feedback of the load disturbance can be fed forward to the controller 60 to adjust the rectifier switching control signals 62a to stabilize the DC bus, as shown by the DC bus value 126b' being substantially stabilized with the DC bus reference 126a in the time period 130'.

Figure 4A:
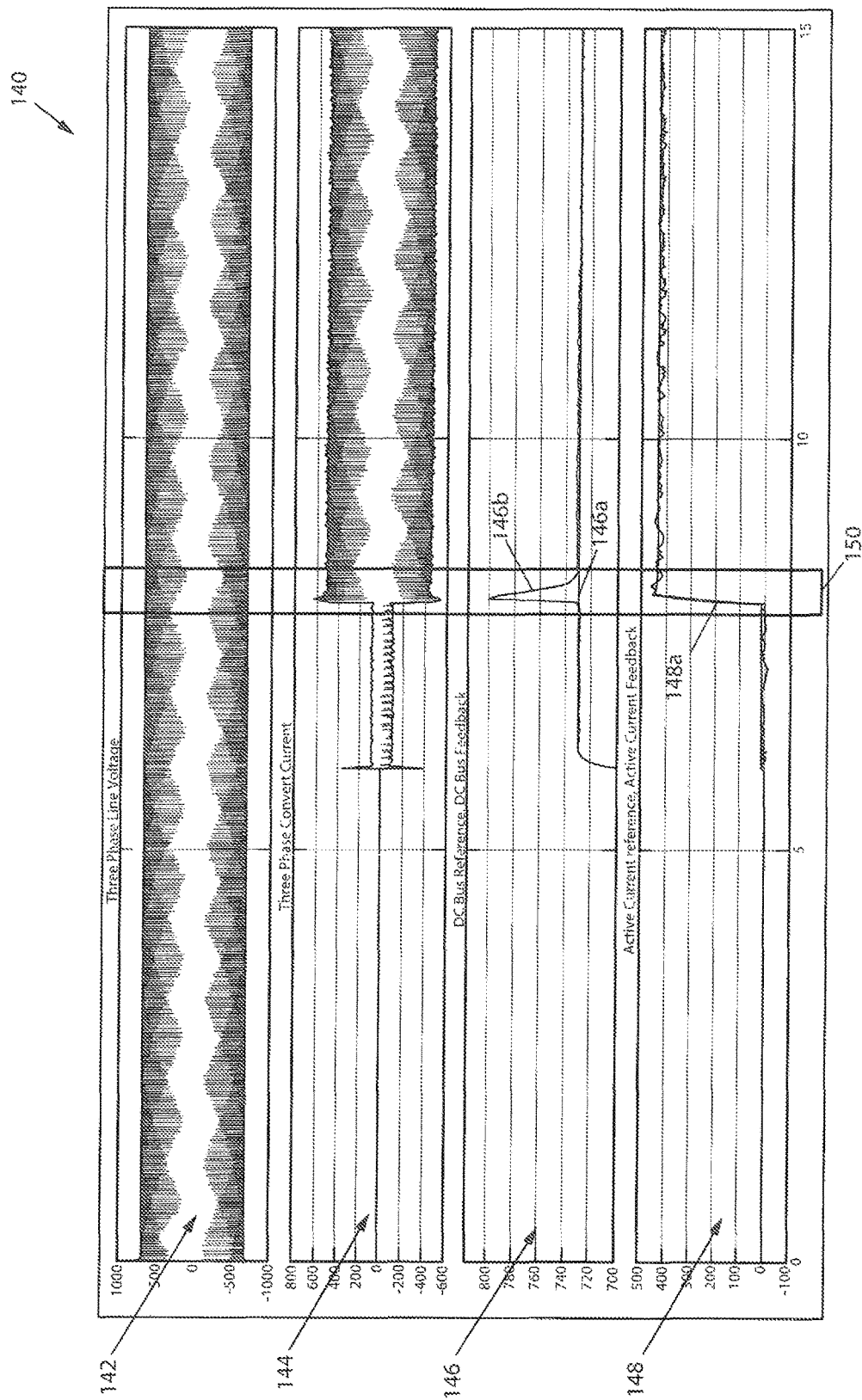
FIG. 4A is an exemplar waveform analysis without adjustment by the controller of FIG. 2, showing a DC bus value with overshoot.
Figure 4B:
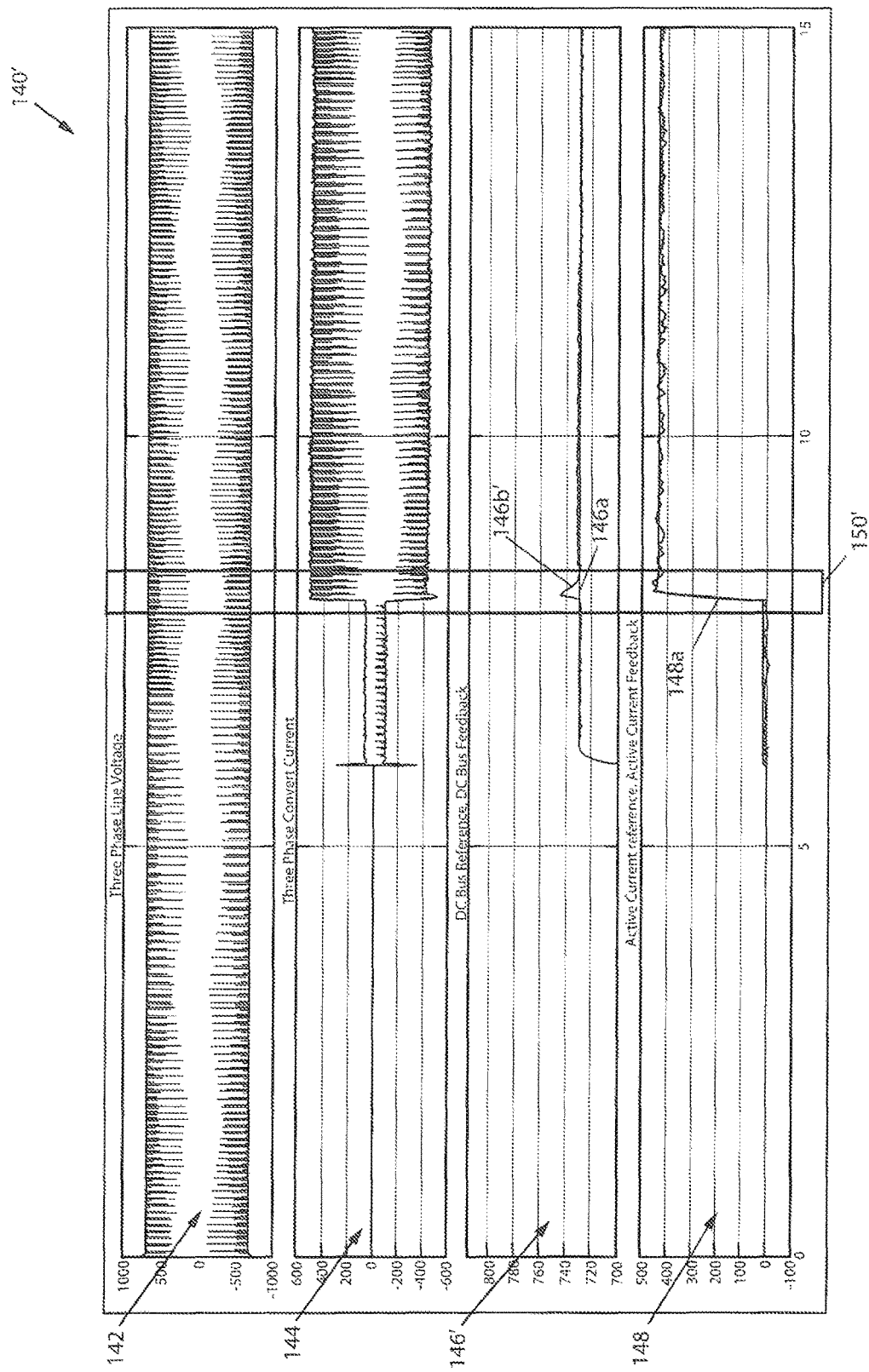
FIG. 4B is an exemplar waveform analysis with adjustment by the controller of FIG. 2, showing the DC bus value stabilized, in accordance with an aspect of the invention.

Referring now to FIG. 4A, by way of example, without adjustment of the rectifier switching control signals 62a according to one or more of the feedback signals, a second waveform analysis 140 includes: a multi-phase AC power waveform 142, which may be provide to the power conversion system 12 from an AC power source; a multi-phase AC input power waveform 144 as received at the rectifier circuit 30; a DC bus waveform 146, which compares a DC bus reference 146a to a determined DC bus value 146b; and an active current reference waveform 148 (or active power feedback), which illustrates load activity which may be caused by the load 18. Each of the aforementioned waveforms is compared to one another with respect to time. In a time period 150, the load 18 may suddenly ramp up as illustrated by a feedback slope 148a of the active current reference. This may be a load disturbance which undesirably causes the DC bus to overshoot from the DC bus reference, as shown by the DC bus value 146b overshooting from the DC bus reference 146a in the time period 150. However, referring now to FIG. 4B, with adjustment of the rectifier switching control signals 62a according to one or more of the feedback signals, feedback of the load disturbance can be fed forward to the controller 60 to adjust the rectifier switching control signals 62a to stabilize the DC bus, as shown by the DC bus value 146b' being substantially stabilized with the DC bus reference 146a in the time period 150'.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A power conversion system comprising:
a converter circuit configured to convert a multi-phase AC input power to produce a DC bus, the converter circuit including a plurality of rectifier switching devices controlled by a plurality of rectifier switching control signals;
an inverter circuit coupled to the DC bus, the inverter circuit including a plurality of inverter switching devices controlled by a plurality of inverter switching control signals to produce a multi-phase AC output power for driving a load; and
a controller executing a program stored in a non-transient medium operable to:
(a) receive a feedback signal corresponding to the multi-phase AC output power; and
(b) adjust the plurality of rectifier switching control signals according to the feedback signal to stabilize the DC bus,
wherein the feedback signal is applied in a control loop for adjusting the plurality of rectifier switching control signals, wherein the control loop is one of first and second control loops with one control loop controlling voltage and the other control loop controlling current, and wherein one control loop is fed forward to the other control loop for adjusting the plurality of rectifier switching control signals.

2. The system of claim 1, wherein the first control loop controls voltage and the second control loop controls current, and wherein the feedback signal is applied in the first control loop and the first control loop is fed forward to the second control loop for adjusting the plurality of rectifier switching control signals.

3. The system of claim 2, wherein the first and second control loops each provide Proportional-Integral (PI) regulation.

4. The system of claim 1, wherein the feedback signal is a first feedback signal, and further comprising receiving second and third feedback signals corresponding to a DC bus reference value and a determined DC bus value, respectively, wherein the second and third feedback signals are compared to produce a DC bus error, and wherein the DC bus error is applied with the first feedback signal in the first control loop.

5. The system of claim 4, further comprising receiving a fourth feedback signal corresponding to the multi-phase AC input power, wherein the first control loop produces an active current reference, and the active current reference is compared to the fourth feedback signal in the second control loop to produce an active current error.

6. The system of claim 5, further comprising a filter circuit coupled to the converter circuit, wherein the filter circuit provides the multi-phase AC input power to the converter circuit.

7. The system of claim 6, wherein the filter circuit is an LCL (inductor-capacitor-inductor) circuit.

8. The system of claim 6, further comprising receiving a fifth feedback signal corresponding to a multi-phase AC input power received by the filter circuit, wherein the second control loop applies the active current error with the fifth feedback signal.

9. A method for power conversion comprising:
converting a multi-phase AC input power to produce a DC bus using a plurality of rectifier switching devices controlled by a plurality of rectifier switching control signals;
producing a multi-phase AC output power for driving a load using a plurality of inverter switching devices coupled to the DC bus and controlled by a plurality of inverter switching control signals;
receiving a feedback signal corresponding to the multi-phase AC output power; and
adjusting the plurality of rectifier switching control signals according to the feedback signal to stabilize the DC bus, and
applying the feedback signal in a control loop for adjusting the plurality of rectifier switching control signals, wherein the control loop is one of first and second control loops with one control loop controlling voltage and the other control loop controlling current, and wherein one control loop is fed forward to the other control loop for adjusting the plurality of rectifier switching control signals.

10. The method of claim 9, wherein the first control loop controls voltage and the second control loop controls current, and wherein the feedback signal is applied in the first control loop and the first control loop is fed forward to the second control loop for adjusting the plurality of rectifier switching control signals.

11. The method of claim 10, wherein the first and second control loops each provide Proportional-Integral (PI) regulation.

12. The method of claim 9, wherein the feedback signal is a first feedback signal, and further comprising receiving second and third feedback signals corresponding to a DC bus reference value and a determined DC bus value, respectively, comparing the second and third feedback signals to produce a DC bus error, and applying the DC bus error with the first feedback signal in the first control loop.

13. The method of claim 12, further comprising receiving a fourth feedback signal corresponding to the multi-phase AC input power, wherein the first control loop produces an active current reference, and comparing the active current reference to the fourth feedback signal in the second control loop to produce an active current error.

14. The method of claim 13, further comprising providing the multi-phase AC input power through a filter circuit.

15. The method of claim 14, wherein the filter circuit is an LCL (inductor-capacitor-inductor) circuit.

16. The method of claim 14, further comprising receiving a fifth feedback signal corresponding to a multi-phase AC input power received by the filter circuit, and applying the active current error with the fifth feedback signal in the second control loop.

* * * * *